United States Patent [19]

Kitagawa

[11] 4,309,092

[45] Jan. 5, 1982

[54] AUTOMATIC EXPOSURE CONTROL CIRCUIT FOR CAMERA

[75] Inventor: Masahiro Kitagawa, Hachioji, Japan

[73] Assignee: Olympus Optical Co., Ltd., Tokyo, Japan

[21] Appl. No.: 227,773

[22] Filed: Jan. 23, 1981

[30] Foreign Application Priority Data

Apr. 30, 1980 [JP] Japan .................................. 55-58114

[51] Int. Cl.³ ..................... G03B 7/081; G03B 15/05
[52] U.S. Cl. ....................................... 354/33; 354/51; 354/60 F
[58] Field of Search ...................... 354/33, 34, 50, 51, 354/60 F, 145

[56] References Cited

U.S. PATENT DOCUMENTS 3,994,001  11/1976  Mitani et al. .................... 354/51

Primary Examiner—Michael L. Gellner
Attorney, Agent, or Firm—Weinstein & Sutton

[57] ABSTRACT

An automatic exposure control circuit for camera having the capability to control the amount of light emitted by a flash discharge tube of an electronic flash comprises bias current booster means which becomes operative as the flash discharge tubes begins to emit light, thereby increasing the speed of response of the control circuit without increasing an input current thereto.

7 Claims, 3 Drawing Figures

FIG. I
(PRIOR ART)
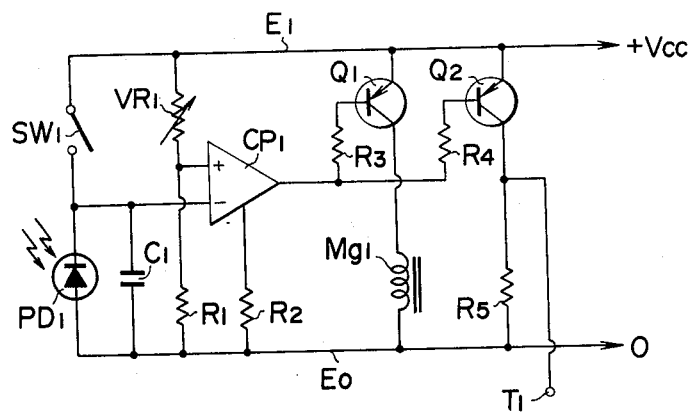
FIG. 2
(PRIOR ART)
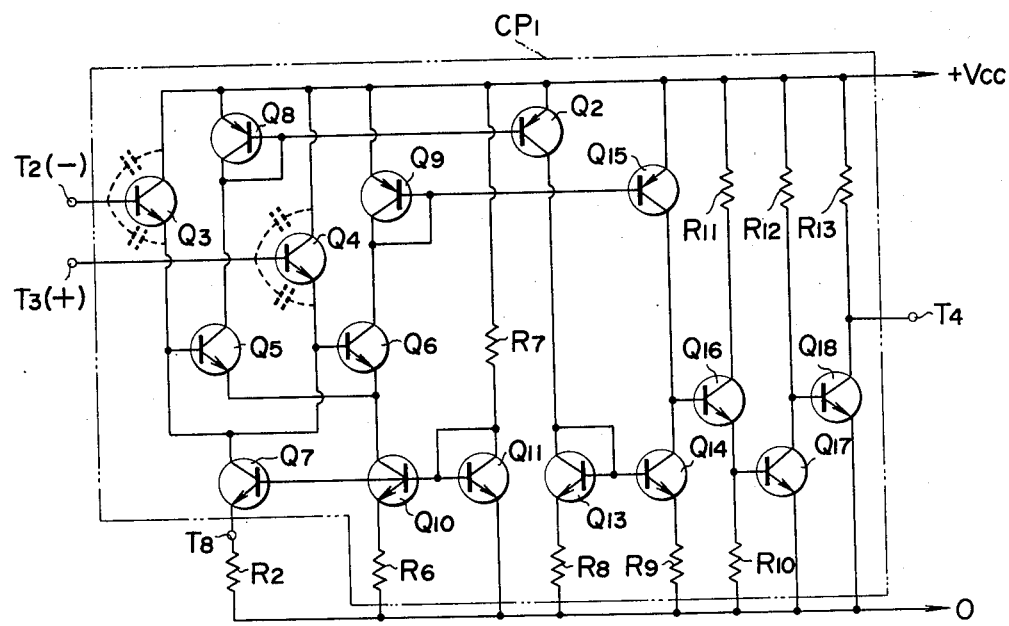

AUTOMATIC EXPOSURE CONTROL CIRCUIT FOR CAMERA

BACKGROUND OF THE INVENTION

The invention relates to an automatic exposure control circuit for camera, and more particularly, to an improvement of such control circuit which has the capability to control the amount of light emitted from a flash discharge tube which is operated when taking a picture under flashlight illumination from an electronic flash.

A conventional automatic exposure control circuit for a camera, for example, a control circuit associated with an electrical shutter, includes a comparator which is formed by an integrated circuit of bipolar type. In a comparator of this type, it is recognized that a stray capacitance or junction capacitance across the base, emitter and collector of a transistor which is used in the input stage as well as an inherent lag in the response of a bipolar transistor itself as may be caused by the recombination of electrons and holes result in a lag in the response of the comparator. Where an output signal from such comparator is utilized to interrupt the emission of light from a flash discharge tube contained in an electronic flash, an overexposure may be caused by a time lag involved with the output signal relative to an input signal inasmuch as the output signal is not immediately inverted in response to the inversion of the input signal supplied to the comparator from a photometric circuit if the latter functions properly to determine a proper amount of exposure.

FIG. 1 is a circuit diagram of a control circuit associated with an electrical shutter of a photographic camera, illustrating one form of a conventional automatic exposure control circuit. The control circuit shown includes a photometry controlling switch SW1 which is opened and closed in response to the opening and closing operation of an electrical shutter, a photometric, photoelectric transducer element PD1 which is adapted to provide an automatic exposure control, a bias capacitor C1 in shunt with the transducer element PD1 for applying a voltage thereacross during a photometric operation, a variable resistor VR1 which is utilized to establish a film speed, a voltage divider resistor R1, a comparator CP1 formed by an integrated circuit of bipolar type, a resistor R2 connected to the comparator CP1 for adjusting an input current thereto, an electromagnet Mg1 which is adapted to close an electrical shutter, a switching transistor Q1 connected in series with the electromagnet Mg1 for controlling the latter, an output resistor R5 connected to a terminal T1 at which an illumination control signal is developed for controlling a flash discharge tube, not shown, of an electronic flash, another switching transistor Q2 for supplying or interrupting the application of an operating voltage +Vcc to the output resistor R5, and base resistors R3, R4 associated with the switching transistors Q1, Q2, respectively.

The photometry controlling switch SW1 is connected in series with the transducer element PD1 across a bus E1 which is connected to a power supply, not shown, and to which the operating voltage +Vcc is supplied and a ground bus E0 which is connected to the ground. Also connected across the buses E1, E0 in shunt with the series combination of the switch SW1 and transducer element PD1 are a series circuit including the variable resistor VR1 and voltage divider resistor R1; another series circuit including the switching transistor Q1 and the electromagnet Mg1; and a further series circuit including the switching transistor Q2 and the output resistor R5.

The junction between the controlling switch SW1 and the transducer element PD1 is connected to an inverting input terminal of the comparator CP1 and is also connected to the bus E0 through the bias capacitor C1. The non-inverting input terminal of the comparator CP1 is connected to the junction between the variable resistor VR1 and the resistor R1 while a control terminal of the comparator CP1 is connected to the bus E0 through the input current adjusting resistor R2. It will be seen that the output terminal of the comparator CP1 is connected to the base of each of the transistors Q1 and Q2 through the resistors R3 and R4, respectively. The transistors Q1 and Q2 are of PNP type, and have their emitters connected in common with the bus E1, and their collectors are connected to the bus E0 through the electromagnet Mg1 and the output resistor R5, respectively. The junction between the transistor Q2 and the output resistor R5 is connected to the terminal T1 where an illumination control signal is developed. It is to be noted that the circuit connection of the comparator CP1 with the bus E1 is not shown even though it is fed from this bus to receive the operating voltage +Vcc.

In operation, the switch SW1 is opened as the electrical shutter is opened, whereby the voltage across the charged capacitor C1 is applied to the transducer element PD1 for allowing the latter to initiate its photometric operation. The charge across the capacitor C1 is discharged in accordance with the amount of light input to the transducer element PD1, and when the potential at the inverting input terminal of the comparator CP1 decreases below a reference potential applied to the non-inverting input terminal thereof which is determined by the voltage divider comprising the variable resistor VR1 and the resistor R1, the output from the comparator CP1 inverts from its low level to its high level. Thereupon, the transistor Q1 is turned off to de-energize the electromagnet Mg1, thus causing the electrical shutter to be closed. At the same time, the transistor Q2 is also turned off, whereby the potential at the terminal T1 changes from its high to its low level. This signal is supplied to an illumination control circuit associated with the flash discharge tube of the electronic flash, thus interrupting the emission of light from the discharge tube.

As mentioned previously, the comparator CP1 is formed by an integrated circuit, the internal equivalent circuit of which can be represented in terms of transistors Q3–Q18 and resistors R6–R13 as indicated in FIG. 2. Specifically, an NPN transistor Q3, representing an input stage, has its base connected to an inverting input terminal T2 while an NPN transistor Q4, also in the input stage, has its base connected to a non-inverting input terminal T3. An output stage is formed by an NPN transistor Q18, and the junction between the collector thereof and resistor R13 is connected to an output terminal T4. In this arrangement, the current fed from the inverting and the non-inverting input terminal T2, T3 is determined by the resistance of the current adjusting resistor R2 which is connected to the emitter of an NPN transistor Q7 or to a control terminal T8 of the comparator CP1, and by the base current of transistors Q5, Q6. In the control circuit described above, the resistor R2 has a large ohmic value to reduce the input current since if the ohmic value of the resistor R2 is reduced to allow an increased input current to flow, the charge on the capacitor C1 will be rapidly discharged through the comparator CP1 and the resistor R2, resulting in reducing the dynamic range of the transducer element PD1.

However, it is to be noted that when the magnitude of the input current to the comparator CP1 is decreased, it takes an increased length of time to charge the stray capacitance (or junction capacitance) across the base and emitter and across the base and collector of the transistors Q3, Q4 connected to the input terminals T2, T3, respectively, which are shown by dotted lines in FIG. 2. This results in a slow response of the comparator CP1, presenting a difficulty that the comparator cannot properly respond to a flashlight illumination having a very reduced duration.

SUMMARY OF THE INVENTION

In view of the foregoing, it is an object of the invention to provide an automatic exposure control circuit for a camera which includes a bias current booster means which becomes operative when a flash discharge tube begins to emit light, thereby increasing the speed of response without requiring an input current of increased magnitude.

In accordance with the invention, booster means increases a bias current applied to transistors contained in the input stage of the comparator as the flash discharge tube begins to emit light. Accordingly, an increased magnitude of collector current flows through the transistors in the input stage, increasing the speed of response of the comparator. In this manner, a lag in tracking the flashlight by the comparator is reduced, avoiding the occurrence of overexposures.

BRIEF DESCRIPTION OF THE DRAWINGS

FIG. 1 is a circuit diagram of a control circuit associated with an electrical shutter, which illustrates one form of conventional automatic exposure control circuit for camera;

FIG. 2 is a circuit diagram illustrating the equivalent circuit of the comparator used in the control circuit of FIG. 1.

DESCRIPTION OF PREFERRED EMBODIMENT

Figure 3:
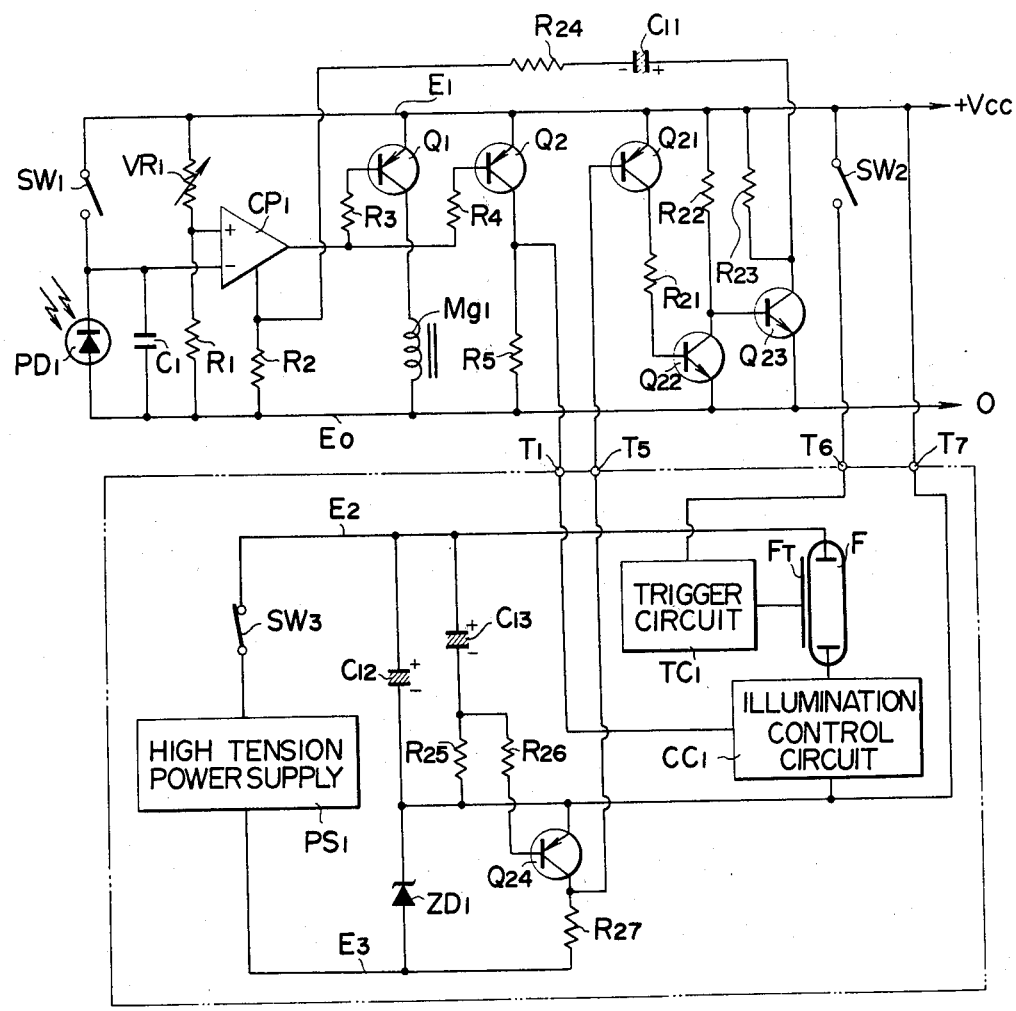
FIG. 3 is a circuit diagram of a control circuit associated with an electrical shutter, representing an automatic exposure control circuit for camera according to one embodiment of the invention, connected with the electrical circuit of an electronic flash.

Referring to FIG. 3, there is shown a control circuit associated with an electrical shutter which represents an automatic exposure control circuit for a camera according to one embodiment of the invention. The control circuit is connected with the electrical circuit of an electronic flash, shown in a phantom line block, whenever the electronic flash is mounted on the camera with which the control circuit of the invention is associated.

It will be noted that a portion of the control circuit which represents the earlier stages thereof remains the same as that shown in FIG. 1, and hence corresponding parts are designated by like reference characters without specifically repeating their description.

The later stage of the control circuit includes three transistors Q21–Q23, four resistors R21–R24 and bias current booster capacitor C11. The transistor Q21 is of a PNP type, having its emitter directly connected to the bus E1, its collector connected through resistor R21 to the base of the transistor Q22 and its base connected to a terminal T5, respectively. The transistor Q22 is of an NPN type, having its collector connected to the bus E1 through resistor R22 and also connected to the base of transistor Q23 and its emitter directly connected to the bus E0. The transistor Q23 is of an NPN type, having its collector connected to the bus E1 through resistor R23 and also connected through a series combination of booster capacitor C11 and resistor R24 to the control terminal of the comparator CP1 and its emitter directly connected to the bus E0.

It is also to be noted that synchro contact SW2, which is adapted to be closed when the electrical shutter is fully open, is connected across the bus E1 and terminal T6 while the bus E1 is also connected to terminal T7.

The electrical circuit of the electronic flash which is adapted to be connected to the control circuit of the electrical shutter essentially comprises a high tension power supply PS1, a main capacitor C12, a flash discharge tube F, illumination control circuit CC1 and a trigger circuit TC1. A pair of buses E2, E3 are connected to the power supply PS1 through a power switch SW3. A series circuit including the main capacitor C12 and a Zener diode ZD1 is connected across these buses. Also connected in shunt with the main capacitor C12 are a series circuit including capacitor C13 and resistor R25 and another series circuit including the flash discharge tube F and the illumination control circuit CC1. The flash discharge tube F has a trigger electrode FT, which is connected to the trigger circuit TC1. The illumination control circuit CC1 is connected to the terminal T1 while the trigger circuit TC1 is connected to the terminal T6.

As is conventional, the Zener diode ZD1 forms a constant voltage circuit, and is shunted by a series combination of a transistor Q24 and a resistor R27. The transistor Q24 is of a PNP type, having its emitter connected to the junction between the main capacitor C12 and the Zener ZD1, its collector connected to the bus E3 through the resistor R27 and its base connected to the junction between the capacitor C13 and resistor R25 through a resistor R26, respectively. The collector of the transistor Q24 is also connected to the terminal T5. Also, the junction between the main capacitor C12 and the Zener diode ZD1 is connected to the terminal T7.

The operation of the electronic flash will be described in conjunction with the operation of the automatic exposure control circuit of the invention.

When the power switch SW3 of the electronic flash is closed, the buses E2, E3 are energized, whereby the main capacitor C12 and the capacitor C13 begin to be charged. The charging circuit of the main capacitor C12 flows through the Zener diode ZD1, producing a constant voltage thereacross which biases the emitter-collector path of the transistor Q24. However, when a picture is not taken and synchro contact SW2 of the camera remains open, the emitter and base of the transistor Q24 assume the same potential, whereby Q24 remains off. As a result, the transistor Q21 in the camera is turned on since its base is biased to a negative potential through the terminal T5 and the resistor R27. The transistor Q22 which is connected to the transistor Q21 is then turned on, whereby the transistor Q23 is turned off, connecting the booster capacitor C11 in circuit with the buses E1, E0 through the resistors R23, R24, R2. It will be understood that the capacitor is charged so that its end terminal which is connected to the resistor R23 is positive.

In response to the depression of a shutter release button, not shown, of a camera, the shutter begins to be opened. Initially the photometry controlling switch SW1 is opened, allowing the transducer element PD1 to be responsive to light input. When the shutter is fully open, the synchro contact SW2 is closed, whereupon the trigger circuit TC1 is activated through the terminal T6 to apply a high voltage to the trigger electrode FT, thus causing the flash discharge tube F to initiate the emission of flashlight. The flashlight from the discharge tube F is reflected by an object being photographed, and then impinges on the transducer element PD1.

At the same time, the initiation of the emission of flashlight from the flash discharge tube F short-circuits the capacitor C12, reducing the voltage level of the bus E2. Consequently, the base of the transistor Q24 is biased to a negative voltage to turn transistor Q24 on. In turn, this turns the transistor Q21 off, transistor Q22 off and transistor Q23 on. Thereupon the voltage level at the junction between the booster capacitor C11 and the resistor R23 and the transistor Q23 becomes equal to the potential of the bus E0, allowing the charge on the capacitor C11 to be discharged through a path including the transistor Q23, the power supply (not shown), the comparator CP1 and resistor R24. This drives the control terminal T8 of the comparator CP1 negative (see FIG. 2), which in turn increases the bias current to the transistors Q3, Q4 (see FIG. 2) in the input stage of the comparator CP1, thus increasing the speed of response of the comparator CP1.

In this manner, a rapid response of the comparator CP1 is maintained if the resistance of the adjusting resistor R2 is increased to reduce the input current to the comparator CP1 in order to increase the dynamic range of the transducer element PD1, thus effectively avoiding any lag in the response of the control circuit to the flashlight. In other words, the output from the comparator CP1 is inverted at the same time as the voltage across the capacitor C1 decreases below the voltage applied to the non-inverting input terminal from the voltage divider, thus turning the transistor Q1 off to deenergize the electromagnet Mg1 to thereby close the shutter. Simultaneously, the transistor Q2 is also turned off to activate the illumination control circuit CC1 through the terminal T1, thus interrupting the emission of flashlight from the flash discharge tube F.

What is claimed is:

1. An automatic exposure control circuit for a camera having the capability to control the amount of light emitted by a flash discharge tube of an electronic flash; characterized by the provision of bias current booster means for increasing the speed of response of said control circuit as the flash discharge tube begins to emit light.

2. An automatic exposure control circuit according to claim 1, further including a photometric circuit and wherein a comparator is connected to the photometric circuit to produce an inverted output when a proper exposure is reached, the inverted output being effective to interrupt the emission of flashlight from the flash discharge tube, the comparator including a control terminal, the electronic flash including a switching element which is adapted to be operated in synchronism with the initiation of the emission of flashlight from the flash discharge tube, the bias current booster means being formed by a bias current booster capacitor connected across the control terminal of the comparator and the switching element such that the booster capacitor is short-circuited through a power supply from which the automatic exposure control circuit is fed whenever the switching element is operated, thereby allowing the charge on the booster capacitor to provide an additional bias current to the comparator in addition to an operating current from the power supply.

3. An automatic exposure control circuit according to claim 2 in which the comparator comprises an integrated circuit of bipolar type.

4. An automatic exposure control circuit according to claim 1 in which the control circuit represents an electrical shutter control circuit.

5. An automatic exposure control circuit for controlling an electronic flash circuit having a flash discharge tube comprising:
   sensing means for generating a signal representing the amount of light reflected from an object illuminated by said flash discharge tube to generate;
   means for comparing the signal generated by said sensing means against an adjustable level for extinguishing said flash discharge tube;
   said comparing means comprising control means for controlling the response time of said comparing means; and
   booster voltage means responsive to operation of said flash discharge tube to apply a voltage to said control means for increasing the response time of said comparing means responsive to illumination of the flash discharge tube.

6. The exposure control circuit of claim 5 wherein said booster voltage means comprises a circuit including capacitor means for applying a voltage to said control means without reducing the input impedance of the comparing means.

7. The exposure control circuit of claim 5 wherein said control means further comprises currently regulating means for regulating current in the circuits receiving the inputs being compared to increased response time when said flash discharge tube is energized.

* * * * *

UNITED STATES PATENT AND TRADEMARK OFFICE
CERTIFICATE OF CORRECTION

PATENT NO. : 4,309,092

DATED : January 5, 1982

INVENTOR(S) : Masahiro Kitagawa

It is certified that error appears in the above—identified patent and that said Letters Patent is hereby corrected as shown below:

Column 4, line 55: Change "circuit" to --current--.

Signed and Sealed this

Twenty-fourth Day of August 1982

[SEAL]

Attest:

GERALD J. MOSSINGHOFF

Attesting Officer       Commissioner of Patents and Trademarks